Feb. 1, 1966 R. W. CALFEE 3,233,181

FREQUENCY SHIFT SIGNAL DEMODULATOR

Filed Jan. 28, 1963 2 Sheets-Sheet 1

INVENTOR.
RICHARD W. CALFEE

BY Fraser and Bogucki

ATTORNEYS

Feb. 1, 1966 R. W. CALFEE 3,233,181

FREQUENCY SHIFT SIGNAL DEMODULATOR

Filed Jan. 28, 1963 2 Sheets-Sheet 2

INVENTOR.
RICHARD W. CALFEE

BY Fraser and Bogucki

ATTORNEYS

United States Patent Office 3,233,181

Patented Feb. 1, 1966

3,233,181
FREQUENCY SHIFT SIGNAL DEMODULATOR

Richard W. Calfee, San Jose, Calif., assignor to International Business Machines Corporation, New York, N.Y., a corporation of New York Filed Jan. 28, 1963, Ser. No. 254,138
16 Claims. (Cl. 329—128)

The present invention relates to demodulator circuits for deriving digital information from a modulated wave and more particularly to a new and improved demodulator circuit for deriving signal information from a frequency shift modulated wave.

In the transmission of digital signals, as well as in telegraph systems, it is well known to modulate a carrier wave by altering its frequency between two or more discrete frequencies in accordance with the information to be transmitted. Irrespective of the method of digital signal coding employed, transmission of the carrier wave at one discrete frequency, $f_m$, may be referred to as the mark frequency and transmission of the carrier wave on another discrete frequency, $f_s$, may be referred to as the space frequency. Thus, in transmission, the carrier wave is transmitted at one or the other of the frequencies $f_m$ or $f_s$ depending upon whether a mark or a space is being transmitted.

In demodulating a received frequency shift modulated wave, conventional prior art apparatus employed frequency selective filters, one of which was tuned to each of the frequencies to be transmitted. In order to provide a high signal to noise ratio in the overall system, it is desirable to reduce the bandwidth to which the filters are capable of responding. Accordingly, highly selective filters are employed. However, with highly selective filters, the rise time of the filter is relatively long. That is, with a tuned circuit, several cycles of the incoming wave are required to cause the filter to provide a given output signal. This means, that in a frequency shift modulated wave, the amount of information to be transmitted in a given time interval is restricted by the selectivity of the filters employed in the demodulator. In the event that the amount of information to be transmitted is increased beyond the rise time capability of the tuned filters at the receiver demodulator, signal information is lost due to a failure of the filters to respond and provide output signals during each of the relatively short intervals in which a particular one of the two discrete frequencies may be transmitted. On the other hand, the selectivity of the filters may be reduced in conventional prior art systems to accommodate a higher rate of information transfer, but with an attendant deterioration in the signal to noise ratio of the overall system due to the fact that a decrease in selectivity of the filters increases the bandwidth within which spurious signals are received.

The present invention is directed to a new and improved demodulator for use in deriving information from a frequency shift modulated wave which does not depend for its operation upon tuned circuits. Rather, the present invention employs digital techniques for the derivation of information from a frequency shift modulated wave and is analogous to an ideal filter arrangement in that its response is unity inside its pass band and substantially zero outside its pass band. Moreover, the demodulator of the present invention has a very small rise time compared with that required by tuned filter arrangements.

Accordingly, it is a principal object of the present invention to provide a new and improved signal demodulator for deriving digital information from a frequency shift modulated wave.

It is another object of the present invention to provide a new and improved frequency shift signal demodulator having a relatively uniform response within a given pass band and substantially zero response outside the given pass band.

It is still another object of the present invention to provide a new and improved frequency shift signal demodulator having minimum rise time.

It is a still further object of the present invention to provide a new and improved arrangement for deriving digital information from a frequency shift modulated wave for effecting a high signal to noise ratio in an overall system while at the same time enabling a high rate of information transfer.

Briefly, in accordance with the present invention, a demodulator for deriving digital information from a frequency shift modulated wave is provided in which information is derived from the wave as a function of the time period between zero crossings of an incoming waveform. More particularly, the demodulator of the present invention contemplates the comparison of a signal or pulse generated at the commencement of the first half cycle of each wave of an incoming frequency shift modulated wave with a signal or pulse generated at the commencement of the second half cycle of each cycle of a received frequency shift modulated wave. In further accordance with the invention, gating means are employed for alternately passing signals generated corresponding to each cycle of the frequency shift modulated wave in accordance with the time period of a cycle or fractional part thereof of the wave.

In one particular embodiment in accordance with the invention, a frequency shift modulated wave is applied to a first means for generating a pulse corresponding to each first half-cycle of the frequency shift modulated wave and is also applied to a second means for generating a pulse corresponding to each second half-cycle of the frequency shift modulated wave. By means of timing circuits, the time intervals between the pulses generated by said first and second pulse generating means are compared to control the passage of a signal via gating means to a selected output terminal in accordance with the frequency of the received wave. One simple arrangement for constructing a frequency shift signal demodulator circuit in accordance with the invention is to provide a plurality of cascaded single-shot multivibrators which are actuated in sequence to control the opening and closing of a pair of gating circuits so as to sample the incoming wave for zero crossings. In this connection, by commencing the actuation of the cascaded multivibrators at the commencement of the first half-cycle of the received wave and generating a signal corresponding to the commencement of each second half-cycle of the received wave, the gating circuits may be operated to pass a pulse to one of two output terminals in accordance with the frequency of the received wave. The result is that the gating circuits may be arranged to be closed during certain time periods corresponding to signal frequencies outside the pass band of the demodulator and may be opened for short intervals to pass pulses to the output terminals in accordance with the selected space and mark frequencies, $f_s$ and $f_m$. Arrangements in accordance with the invention may be constructed to possess a minimal rise time depending only upon the construction of the pulse generators and logical gating arrangements. Moreover, within the response band of the demodulator, a relatively uniform response is provided while outside of the band substantially zero response is provided. Therefore, the present invention provides a freqency shift signal demodulator having both high selectivity and minimum rise time to a degree not previously known in connection with frequency shift signal demodulators utilizing tuned circuits.

A better understanding of the invention may be had from a reading of the following detailed description and and an inspection of the drawings, in which.

In considering the operation of the present invention, the characteristics of frequency shift modulated waves should be considered. In a frequency shift modulated wave the frequency of the wave itself represents the information being transferred. That is, irrespective of the method of digital or other coding of the wave, a first given frequency represents a mark while a second given frequency represents a space. Considering a single cycle of the frequency shift modulated wave, the time period of a cycle represents the information to be transferred. Since the half-cycles of the wave are evenly spaced, it may also be said that the time between zero crossings of the incoming waveform likewise represents the information.

Where $T_S$ is the period of a wave representing a space, $T_S \pm \Delta T$ defines a time interval within which a zero crossing may be sensed as a space. Similarly, where $T_M$ is the period of a wave representing a mark, $T_M \pm \Delta T$ defines a time interval within which a zero crossing may be sensed as a mark. Of course, the period of the wave is the reciprocal of its frequency. Hence $$T_S = \frac{1}{f_s}$$

where $f_s$ is the frequency of the wave representing a space and $$T_M = \frac{1}{f_m}$$

where $f_m$ is the frequency of the wave representing a mark. The time increment $\Delta T$, in the above expressions may be determined by $$\Delta T \leqq \frac{T_M - T_S}{2}$$

where the space frequency, $f_s$, is greater than the mark frequency $f_m$. Accordingly, $\Delta T$ may be considered the bandwidth equivalent of the arrangement since it determines the interval within which a response is provided to a given wave which may be of slightly different frequency from that expected.

The arrangement therefore is analogous to a bandpass filter at the mark or space frequency, except it is a relatively perfect filter in that its response is unity during the different time intervals and zero outside those intervals. The demodulator also has a very small rise time since logical circuits can be designed as will be described in detail below to operate substantially instantaneously.

Figure 1:
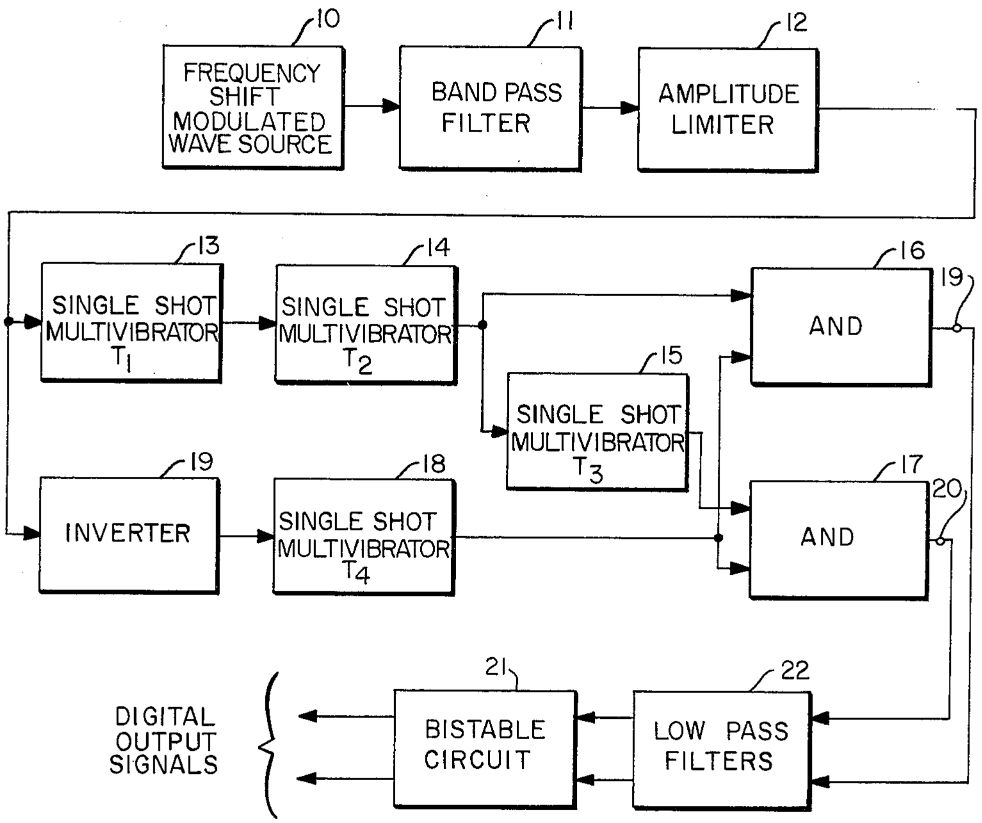
FIG. 1 is a block diagram of a demodulator for deriving digital information from a frequency shift modulated wave in accordance with the invention.
Figure 2:
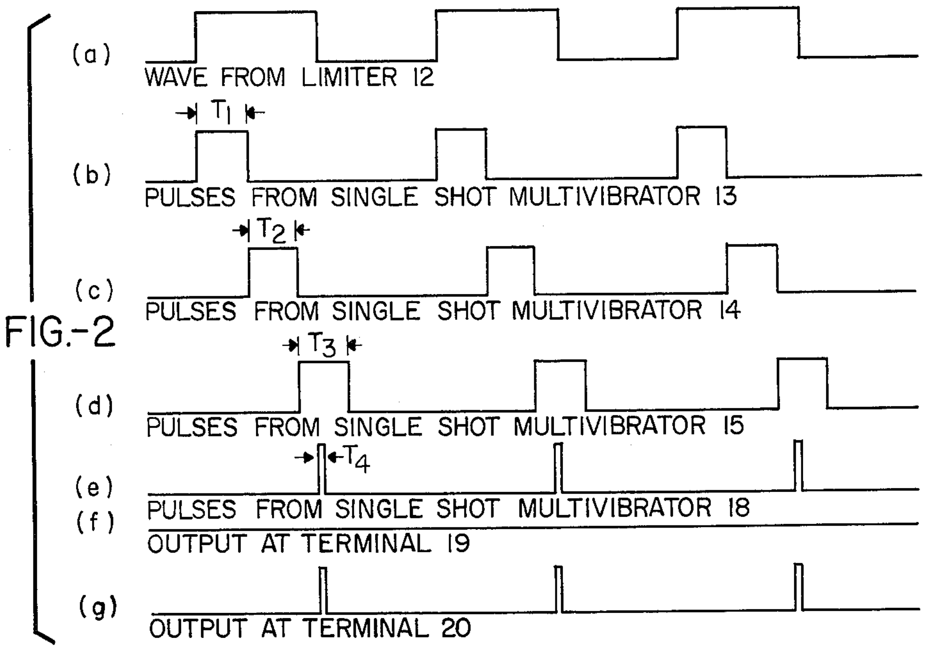
FIG. 2 is a set of graphical illustrations of various signals appearing in the system of FIG. 1 upon receipt of a frequency shift modulated wave of a first given frequency.

One particular embodiment of the present invention for effecting a demodulation of a frequency shift modulated wave is shown in FIG. 1. In FIG. 1 frequency shift modulated signals of the type described above are provided from a source 10. It will be appreciated that the received signals would normally be derived from a transmission medium such as a telephone line or radio telephone link with the source 10 including the necessary receiving equipment. Moreover, the frequency shift signals themselves may be in turn modulated on another carrier wave at a higher frequency for transmission with conventional demodulators being employed to derive the frequency shift modulated wave prior to application to the demodulator of the present invention. Since arrangements for the transmission of carrier modulated signals are well known, no further description of the transmission link, the modulators or the demodulators for deriving the frequency shift modulated wave itself is believed to be necessary. In any event, the frequency shift modulated wave from the source 10 may be first applied to a bandpass filter 11 which functions to pass all of the frequencies which are expected to be contained in the frequency shift modulated wave. For example, in a representative system, the frequencies $f_s$ and $f_m$ may be respectively 1500 and 1700 cycles per second. Accordingly, the band width of the bandpass filter 11 should be nominally 200 cycles per second with a center frequency of 1600 cycles per second. The signals from the bandpass filter 11 may be amplified as necessary by means not shown and applied to an amplitude limiter 12. The amplitude limiter 12 functions to provide at its output essentially a square wave from the incoming sine wave passed by the bandpass filter 11. By virtue of its limiting action, the tops of the sine wave are effectively eliminated so that the wave appears as shown in FIGS. 2(*a*) and 3(*a*); FIG. 2(*a*) corresponding to the mark frequency $f_m$ and FIG. 3(*a*) corresponding to the space frequency $f_s$. The amplitude limited wave from the limiter 12 is then applied to the pulse generating and logical circuit arrangements of the demodulator of the invention. In FIG. 1, the output of the limiter 12 is applied to a cascaded series of single-shot multivibrators 13, 14 and 15 which are successively actuated each by the trailing edge of the wave generated by the preceding device. The first single-shot multivibrator 13 has a time period $T_1$ and is responsive to positive-going excursions of the signal from the limiter 12. The single-shot multivibrator 14 on the other hand, is responsive to negative-going excursions of the output signal from the single-shot multivibrator 13 and possesses a time period $T_2$. The third single-shot multivibrator 15 is also responsive to negative-going excursions of the wave provided by the single-shot multivibrator 14 and has a time period $T_3$. The result is that the single-shot multivibrators 13, 14, and 15 are successively operated with the single-shot multivibrator 13 being "on" for a time period $T_1$ succeeding each positive-going excursion of the wave from the limiter 12, the second single-shot multivibrator 14 commencing its "on" period at the end of the time $T_1$ and being "on" for a period $T_2$, and the third single-shot multivibrator 15 commencing its "on" period at a time $T_1+T_2$ and being on for a period of $T_3$. The output signals from the single-shot multivibrators 14 and 15 are respectively applied to gating means in the form of the "AND" circuits 16 and 17. Therefore, the "AND" circuit 16 is open during the time interval from the end of $T_1$ through $T_2$ while the "AND" circuit 17 is open during a time interval commencing at the end of time $T_2$ and continuing through time $T_3$.

It will be noted that the output signal from the single shot multivibrator 13 is not applied to any gating means. The period $T_1$ of the single-shot multivibrator 13 effectively determines the period within which the demodulator of the present invention is incapable of responding to an input signal. Therefore, by varying the time $T_1$, the pass band of the demodulator of the invention may be selected at will. As noted above, the signal from the limiter 12 is applied to the cascaded multivibrators 13, 14, and 15 to enable the "AND" gates 16 and 17 to pass pulses applied to their inputs during predetermined time intervals. The pulse to be applied to the "AND" gates 16 and 17 is generated by applying the waveform from the limiter 12 to a single-shot multivibrator 18 having a period $T_4$. The single-shot multivibrator 18 is actuated in accordance with each negative-going excursion of the wave from the limiter 12. To illustrate the fact that the single-shot multivibrator 18 is responsive to excursions opposite from that of the first single-shot multivibrator 13 of the upper chain, an inverter 19 is shown in FIG. 1. It will be appreciated that the single-shot multivibrator 18 may as well be directly responsive to negative-going excursions of the wave from the limiter 12 in which case the inverter 19 may be omitted.

In overall operation therefore, the multivibrator 13 is actuated at the commencement of the first half-cycle of the frequency shift modulated wave while the single-shot multivibrator 18 is actuated at the commencement of the second half-cycle of each cycle of the frequency modulated wave. The result is that a time period exists between the actuation of the single-shot multivibrator 13 and the single-shot multivibrator 18 representing the information being transmitted. By a proper selection of the times $T_2$ and $T_3$ of the single-shot multivibrators 14 and 15 respectively, the "AND" circuits 16 and 17 are enabled to pass the pulse from the single-shot multivibrator 18 in accordance with the information being transmitted to a selected one of two output terminals 19 and 20.

In determining the time intervals of the various multivibrators of FIG. 1, the following considerations are given. First, the time interval $T_4$ of the single-shot multivibrator 18 is relatively short compared with any other of the time intervals inasmuch as the single-shot multivibrator 18 merely functions to generate a timing signal identifying the commencement of the second half-cycle of each cycle of the wave from the limiter 12. With respect to the time intervals $T_1$, $T_2$ and $T_3$ of the single shot multivibrators 13, 14 and 15 respectively, since we are looking for a zero crossing to be within a time interval defined by $T_S \pm \Delta T$ for a space and a zero crossing to be within a time interval defined by $T_M \pm \Delta T$ for a mark, $$T_S = \frac{1}{f_s}$$

and $$T_M = \frac{1}{f_m}$$

in determining a bandwidth equivalent represented by $2\Delta T$, then $$T_1 = \frac{T_S - \Delta T}{2}$$

$$T_2 = \Delta T$$

$$T_3 = \Delta T$$

with $f_s$ the high frequency, $f_s > f_m$ and $\Delta T$ $$= \frac{T_M - T_S}{2}$$

Figure 3:
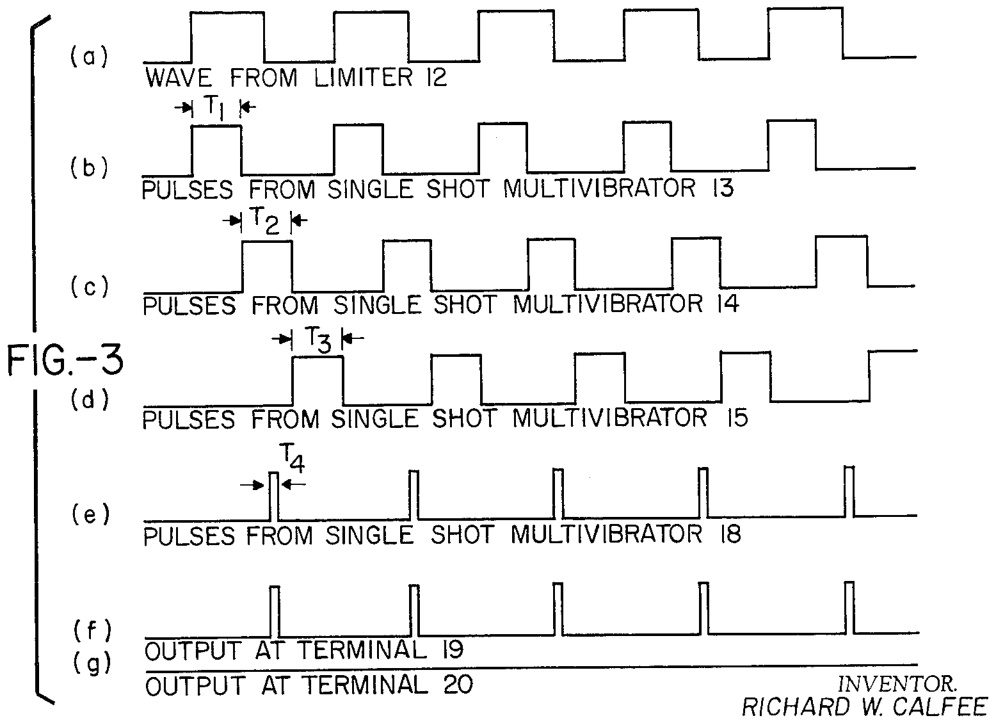
FIG. 3 is a set of graphical illustrations depicting various signals appearing in the system of FIG. 1 upon receipt of a frequency shift modulated signal of a second given frequency.

The operation of the invention may be understood from a consideration of the graphical illustrations of FIGS. 2 and 3. In FIG. 2, a mark frequency as it appears at the output of limiter 12 is shown in FIG. 2(*a*). FIG. 2(*b*) shows the signal output from the single-shot multivibrator 13 having a time period $T_1$, FIG. 2(*c*) shows the signal output from the single-shot multivibrator 14 having a time $T_2$ and FIG. 2(*d*) shows the pulses generated by the single-shot multivibrator 15 having a time period $T_3$. As noted above, the single-shot multivibrator 13 establishes the pass band of the system while the single-shot multivibrators 14 and 15 respectively open the gating circuits 16 and 17. Therefore, the "AND" circuit 16 is enabled to pass pulses during intervals indicated by the waveform of FIG. 2(*c*) while the "AND" circuit 17 is enabled to pass pulses during the time intervals indicated by the illustration of FIG. 2(*d*). The waveform of FIG. 2(*e*) corresponds to the pulses generated at the commencement of each second half-cycle of the frequency shift modulated wave by the single-shot multivibrator 18. A comparison of the graphical illustrations of FIGS. 2(*c*), (*d*) and (*e*) illustrates that the pulse from the single-shot multivibrator 18 of FIG. 2(*e*) appears during the time interval of the waveform of FIG. 2(*d*). The result is, that the pulse is passed in the arrangement of FIG. 1 by the gate 17 to the output terminal 20 as shown in FIG. 2(*g*) while at the same time the "AND" circuit 16 remains closed and no pulse appears at the output terminal 19 as shown in FIG. 2(*f*).

The operation of the circuit in response to a frequency shift modulated signal of a frequency $f_s$ is shown in FIG. 3. FIG. 3(*a*) corresponds to the amplitude limited signal from the limiter 12 with FIGS. 3(*b*), 3(*c*) and 3(*d*) each representing the waveforms, from the single-shot multivibrators 13, 14 and 15 respectively as described above in connection with FIG. 2. Similarly, FIG. 3(*e*) shows the pulse generated by the single-shot multivibrator 18 at the commencement of each second half-cycle of the frequency shift modulated wave. Again, comparing the waveforms of FIGS. 3(*c*), 3(*d*) and 3(*e*), it is apparent that the time at which the pulses of FIG. 3(*c*) occurs corresponds to the time period $T_2$ of the single-shot multivibrator 14. Hence, the gate 16 is enabled to pass the pulse from the single-shot multivibrator 18 to the output terminal 19 as shown in FIG. 3(*f*) while no signal appears at the terminal 20 as shown in FIG. 3(*g*).

Where $\tau$ equals the spacing between zero crossings of the input signal, the "AND" circuit 16 provides an output pulse when $$T_1 < \tau < T_1 + T_2$$

and "AND" circuit 17 provides an output pulse when $$T_1 + T_2 < \tau < T_1 + T_2 + T_3$$

Although it is conceivable that in a particular system having a maximum information transfer rate, each cycle of the incoming wave might represent either a mark or space so that the appearance of each pulse at the output terminals 19 and 20 represents a mark or a space, in a more usual system, several cycles of the incoming wave represent a particular mark or space. Accordingly, several pulses appear at the terminals 19 or 20 for each mark or space of the incoming wave and the output pulses may be directly converted into binary digital data by applying them to a conventional bistable trigger circuit 21. In order to reduce the possibility of noise affecting the circuit, a suitable counting or accumulating arrangement may be connected between the bistable circuit and the terminals 19 and 20 to actuate the bistable circuit to represent a particular binary value only where a given number of pulses appear at the output terminal in a row. The accumulator circuit, if desired, may take the form of conventional low-pass filters 22 as shown.

Although a particular arrangement in accordance with the invention has been shown in FIG. 1 and described in detail above, it will be appreciated that various alternative arrangements, modifications and additions thereto are possible in the practice of the present invention to adapt the structure to the particular circumstances. Therefore, the above description and illustration of FIG. 1 is intended to be by way of example only of one successful way in which the principles of the present invention may be utilized. Accordingly, all alternative arrangements, modifications and improvements falling within the scope of the annexed claims should be considered to be a part of the present invention.

What is claimed is:

1. A demodulator for deriving digital information from a frequency shift modulated wave, including the combination of first means for generating a pulse corresponding to each transition of said frequency shift modulated wave in a first given direction, second means for generating a pulse corresponding to each transition of said frequency shift modulated wave in a second given direction, and gating means coupled to said first and second pulse generating means for passing the pulse from said second pulse generating means to one of two output terminals in accordance with the frequency of said frequency shift modulated wave.

2. A demodulator for deriving digital information from a frequency shift modulated wave including the combination of first means for generating a pulse corresponding to each first half-cycle of said frequency shift modulated wave, second means for generating a pulse corresponding to each second half-cycle of said frequency shift modulated wave, and gating means coupled to said first and second pulse generating means for passing a pulse to a selected one of two output terminals in accordance with the frequency of said frequency shift modulated wave.

3. A demodulator for deriving digital information from a frequency shift modulated wave, including the combination of a first pulse generating means for generating a pulse corresponding to the beginning of each cycle of said frequency shift modulated wave, a second pulse generating means for generating a pulse corresponding to each cycle of said frequency shift modulated wave but displaced in time with respect to the pulses generated by said first pulse generating means by a time interval corresponding to one-half cycle of said frequency shift modulated wave, and gating means coupled to said first and second pulse generating means for passing a pluse to a selected one of two output terminals in accordance with the frequency of said frequency shift modulated wave.

4. A demodulator for deriving digital information from a frequency shift modulated wave including the combination of a first pulse generator for generating a pulse coincident with the commencemnt of the first half-cycle of each cycle of said frequency shift modulated wave, a second pulse generator for generating a pulse coincident in time with the commencement of the second half-cycle of each cycle of said frequency shift modulated wave, and gating means coupled to said first and second pulse generators for sensing the time interval between pulses from said first and second pulse generators for passing a pulse to a selected one of two output terminals in accordance with the frequency of said frequency shift modulated wave.

5. A demodulator for deriving digital information from a frequency shift modulated wave including the combination of a plurality of cascaded pulse generators for providing a plurality of timed pulses initiated at the commencement of each cycle of said frequency shift modulated wave, a pulse generator for generating a pulse coincident with the commencement of each second half-cycle of said frequency shift modulated wave, and gating means coupled between said plurality of pulse generators and said second half-cycle pulse generator for providing an output pulse at a selected one of two output terminals in accordance with a comparison of the pulses identifying the commencement of each second half cycle of said frequency modulated wave and said timing pulses generated sequentially in response to the commencement of each cycle of said frequency shift modulated wave.

6. A demodulator for deriving digital information from a wave which is shifted from one frequency to another in accordance with digital information including the combination of means generating a first train of pulses corresponding to the commencement of each cycle of said modulated wave, means generating a second train of pulses corresponding to the commencement of each second half-cycle of each cycle of said modulated wave, and means comparing said first and second pulse trains to provide an output signal corresponding to the digital information represented by the frequency of said modulated wave.

7. A demodulator for deriving digital information from a frequency shift modulated wave, including a combination of means generating a train of pulses corresponding to the commencement of the second half-cycle of each successive cycle of said frequency shift modulated wave, a first gate coupled to said pulse generating means, a second gate coupled to said pulse generating means, means enabling said first gate to pass pulses from said pulse generating means during a predetermined time interval after the commencement of each cycle of said frequency shift modulated wave corresponding to a first frequency, and means enabling said second gate to pass said train of pulses at a second predetermined time interval after the commencement of each cycle of said frequency shift modulated wave corresponding to a second frequency whereby the pulses from said pulse generating means are passed by said first and second gates in accordance with the frequency of said frequency shift modulated wave.

8. A demodulator for deriving digital information from a frequency shift modulated wave including the combination of a plurality of cascaded single-shot multivibrators the first of which is responsive to the commencement of each cycle of said frequency shift modulated wave, and successive ones of which are responsive to the trailing edge of a pulse from a preceding single-shot multivibrator so that each successive multivibrator provides a pulse during a successive time interval after the commencement of each cycle of said frequency shift modulated wave, means generating a train of pulses corresponding to the commencement of the second half-cycle of each cycle of said frequency shift modulated wave, first gating means coupled to said pulse generating means and to a selected one of said single shot multivibrators for passing the pulses from said pulse generating means during predetermined time intervals corresponding to a first frequency of said frequency shift modulated wave, and a second gating means coupled to said pulse generating means and to a selected one of said single shot multivibrators for passing pulses from said pulse generating means during predetermined time intervals corresponding to a second frequency of said frequency shift modulated wave.

9. A demodulator for deriving digital information from a frequency shift modulated wave including the combination of at least three cascaded single-shot multivibrators, the first of which is responsive to the commencement of each cycle of said frequency modulated wave and possesses a time interval in its astable condition less than the time interval of a half-cycle of any expected frequency of said frequency shift modulated wave, a second one of said cascaded single-shot multivibrators being responsive to the trailing edge of a pulse generated by the first of said single-shot multivibrators, and having a time period in its astable state which when added to the time period of said first single-shot multivibrator corresponds to an expected time period of a half-cycle of a first frequency of said frequency shift modulated wave, the third of said single-shot multivibrators being responsive to the trailing edge of a pulse provided by said second single-shot multivibrator and having a time period in its astable state which when added to the time periods of said first and second single-shot multivibrators corresponds to a half-cycle of a second expected frequency of said frequency shift modulated wave, multivibrator means generating a train of pulses corresponding to the commencement of the second half-cycle of each cycle of said frequency shift modulated wave, first gating means coupled to receive said train of pulses and to said second single shot multivibrator for passing pulses when said frequency shift modulated wave is of said first expected frequency, and second gating means coupled to receive said train of pulses and to said third single-shot multivibrator for passing pulses when said frequency shift modulated wave is of said second expected frequency.

10. A demodulator for deriving digital information from a frequency shift modulated wave, including the combination of an amplitude limiter to which said wave is applied, first means for generating a pulse corresponding to each transition of the wave from said limiter in a first given direction, second means for generating a pulse corresponding to each transition of the wave from said limiter in a second given direction, and gating means coupled to said first and second pulse generating means for passing the pulse from said second pulse generating means to one of two output terminals in accordance with the frequency of said frequency shift modulated wave.

11. A demodulator for deriving digital information from a frequency shift modulated wave including the combination of first means for generating a pulse corresponding to each first half-cycle of said frequency shift modulated wave, second means for generating a pulse corresponding to each second half cycle of said frequency shift modulated wave, gating means coupled to said first and second pulse generating means for passing a pulse to a selected one of two terminals, and a bistable circuit coupled to said terminals for providing digital output signals in accordance with the frequency of said frequency shift modulated wave.

12. A demodulator for deriving digital information from a frequency shift modulated wave, including the combination of a first pulse generating means for generating a pulse corresponding to the beginning of each cycle of said frequency shift modulated wave, a second pulse generating means for generating a pulse corresponding to each cycle of said frequency shift modulated wave but displaced in time with respect to the pulses generated by said first pulse generating means by a time interval corresponding to one-half cycle of said frequency shift modulated wave, gating means coupled to said first and second pulse generating means for passing a pulse to a selected one of two terminals in accordance with the frequency of the frequency shift modulated wave, accumulator means coupled to said terminals, and a bistable circuit coupled to said accumulator means for providing an output signal corresponding to the frequency of said modulated wave.

13. A demodulator in accordance with claim 12 in which said accumulator means comprises at least one low pass filter.

14. A demodulator for deriving digital information from a frequency shift modulated wave having first and second frequencies indicative of different digital values comprising: first means responsive to the beginning of each first half cycle of said frequency shift modulated wave for defining adjacent first and second separate time intervals during each signal cycle, said first time interval occurring prior to the completion of a predetermined time interval equal to one-half a cycle of a signal having a frequency midway between said first and second frequencies, and said second time interval occurring after said predetermined time interval; means responsive to the commencement of the second half cycle for generating a signal pulse; means for detecting the occurrence of said signal pulse during said first time interval to indicate one digital value and for detecting the occurrence of said pulse during said second time interval to indicate the other digital value.

15. A demodulator for deriving digital information from a frequency shift modulated wave having first and second frequencies representative of different digital values comprising: first means responsive to the occurrence of a first determinable portion of each signal cycle for defining separate first, second and third adjacent time intervals; means responsive to a second different definable portion of each signal cycle to produce a signal pulse, the sum of said first and second time intervals being equal to the average time interval between the first and second definable portions of the signal cycles at said first and second frequencies; and gating means responsive to said first means and said signal pulse for detecting the occurrence of said signal pulse during said second time interval to indicate one digital value and for detecting the occurrence of said signal pulse during said third time interval to indicate the other value, whereby the durations of said second and third time intervals are selected to define the frequency response limits of the demodulator.

16. A demodulator for deriving digital information from a frequency shift modulated wave having a plurality of distinct signal frequencies representative of different digital values comprising: means responsive to a definable portion of each cycle of said frequency modulated wave to generate a plurality of time intervals of fixed duration within each cycle; means responsive to a second different definable portion of each cycle to generate a signal pulse, each of said plurality of time intervals occurring at a given time to coincide with the occurrence of said second definable portion of each cycle when the frequency shift modulated wave is at one of said plurality of frequencies; and gating means responsive to the coincidence of the signal pulse with one of said plurality of time intervals for generating an output signal indicative of said different digital values.

References Cited by the Examiner

UNITED STATES PATENTS

| | | | |
|---|---|---|---|
| 2,716,189 | 8/1955 | Ayres | 329—128 |
| 2,904,683 | 9/1959 | Meyer | 329—128 |

ROY LAKE, *Primary Examiner.*

ALFRED F. BRODY, *Examiner.*